(12) United States Patent
Anderson

(10) Patent No.: US 6,405,636 B1
(45) Date of Patent: Jun. 18, 2002

(54) BRAKE ACTUATION HAVING SNAP-FIT TAMPER RESISTANT SPRING CHAMBER

(75) Inventor: Maurice Anderson, Lawson, MO (US)

(73) Assignee: Haldex Brake Corporation ( * ) Notice: Subject to any disclaimer, the term of this patent is extended or adjusted under 35 U.S.C. 154(b) by 0 days.

(21) Appl. No.: 09/833,445

(22) Filed: Apr. 12, 2001

(51) Int. Cl.⁷ ............................................. F01B 19/00
(52) U.S. Cl. ......................... 92/98 R; 92/128; 29/513; 220/4.06
(58) Field of Search ......................... 92/63, 98 R, 128, 92/130 A; 29/513, 521; 403/326, 329; 220/4.06

(56) References Cited

U.S. PATENT DOCUMENTS

| | | | |
|---|---|---|---|
| 1,369,001 A | * 2/1921 | Bentley .................... 29/513 X |
| 2,670,098 A | 2/1954 | Thompson |
| 3,499,574 A | 3/1970 | Yates, Jr. |
| 3,510,023 A | 5/1970 | Ullman et al. |
| 3,610,306 A | 10/1971 | Summers |
| 3,642,166 A | 2/1972 | Starr |
| 3,809,304 A | 5/1974 | Flanders |
| 3,851,788 A | 12/1974 | Hammes |
| 4,166,549 A | 9/1979 | Schütz et al. |
| 4,480,530 A | 11/1984 | Holmes |
| 4,745,849 A | 5/1988 | Emilsson et al. |
| 4,778,074 A | 10/1988 | Kelly |
| 4,850,263 A | 7/1989 | Rumsey et al. ............. 92/63 |
| 4,887,513 A | 12/1989 | Ewald et al. |
| 4,960,036 A | 10/1990 | Gummer et al. ............ 92/63 |
| 5,025,709 A | * 6/1991 | Miyazaki ................. 92/98 R |
| 5,062,455 A | 11/1991 | Schurter et al. |
| 5,067,391 A | 11/1991 | Choinski et al. ............ 92/48 |
| 5,074,024 A | * 12/1991 | Gautier ..................... 29/513 |
| 5,193,432 A | * 3/1993 | Smith .................... 92/130 R |
| 5,205,205 A | 4/1993 | Choinski et al. ............ 92/63 |
| 5,263,403 A | 11/1993 | Choinski et al. ............ 92/63 |
| 5,285,716 A | 2/1994 | Thompson .................. 92/63 |
| 5,297,471 A | * 3/1994 | Boehm et al. ............ 92/98 R |
| 5,311,809 A | 5/1994 | Choinski et al. ............ 92/63 |
| 5,315,918 A | 5/1994 | Pierce ...................... 92/63 |
| 5,353,688 A | 10/1994 | Pierce et al. .............. 92/63 |
| 5,433,138 A | 7/1995 | Choinski et al. ........... 92/128 |
| 5,487,484 A | 1/1996 | Bonniau et al. |
| 5,560,280 A | 10/1996 | Rumsey .................... 92/48 |
| 5,621,183 A | 4/1997 | Bailey |
| 5,640,894 A | 6/1997 | Zarybnicky, Sr. et al. |
| 5,758,564 A | * 6/1998 | Smith et al. ............. 92/98 R |
| 5,765,466 A | * 6/1998 | Plantan et al. ........... 92/98 R |
| 6,050,372 A | 4/2000 | Fisher |
| 6,129,004 A | * 10/2000 | Smith et al. ............. 92/98 R |
| 6,131,501 A | * 10/2000 | Smith et al. ............. 92/98 R |
| 6,164,187 A | * 12/2000 | Stojic ...................... 92/63 |

FOREIGN PATENT DOCUMENTS

GB    2000 225 A    6/1978

* cited by examiner

Primary Examiner—John E. Ryznic
(74) Attorney, Agent, or Firm—St. Once Steward Johnston & Reens LLC

(57) ABSTRACT

A spring brake actuator having a flange case and a head is provided. The flange case includes a radially outwardly extending annular flange, and the head includes a shoulder and a collar extending therefrom. The collar includes a plurality of radially spaced apart slots defining a plurality of radially spaced apart tabs, each of the tabs having a hook portion projecting radially inwardly, and each of the tabs being elastically deformable radially outwardly. In an assembled position, when the head is attached to the flange case, the annular flange of the flange case is received by the collar of the head and the hook portions of the tabs engage a lower surface of the annular flange so as to inhibit separation of the head from the flange case. A method of assembling such a spring bake actuator is also provided

39 Claims, 3 Drawing Sheets

BRAKE ACTUATION HAVING SNAP-FIT TAMPER RESISTANT SPRING CHAMBER

FIELD OF THE INVENTION

The present invention relates generally to braking systems and, more specifically, to brake actuators. Even more particularly, the present invention relates to a snap-fit tamper-resistant spring brake actuator and a method of assembling the same.

BACKGROUND OF THE INVENTION

Fluid-operated braking systems have long been used to control the movement of motor vehicles in a safe and effective manner. In particular, air brakes are commonly used on commercial vehicles such as trucks, which typically have large gross vehicle weights. The considerable inertial mass of these heavy-duty vehicles in combination with the high speeds at which they travel requires a braking system which responds rapidly with substantial braking power. One system component which is instrumental in the operation of air brake systems is the brake actuator, which provides the force necessary when braking a vehicle.

In a typical double diaphragm spring brake actuator, a barrel-shaped power spring stores potential energy and exerts the large force required for braking in case of air pressure failure. Air pressure acting on a diaphragm compresses the power spring and maintains it in its brake release position. When the air is exhausted, the power spring acts on the diaphragm, typically an elastomeric diaphragm or a piston, and thereby applies the brakes in case of failure of the system air pressure.

The power spring is positioned in a spring chamber, which is typically formed by clamping an elastomeric diaphragm between a head (sometimes also known as a spring housing or spring chamber) and a flange case (sometimes known as an adaptor). The power spring is compressed within the spring chamber between the head and the diaphragm. The power spring has a high spring constant and is normally compressed to a height of less than 3 inches from an original uncompressed heightof from 9 to 12 inches. The power spring, therefore, stores a substantial amount of potential energy, usually exerting a force on the head of about 2,000 to 3,000 pounds.

Unauthorized removal of the head, therefore, could be dangerous due to the large potential energy of the power spring. In addition, unauthorized replacement of the head could result in a poor diaphragm seal or other internal defects. Therefore, it is conventional to discourage unauthorized removal and replacement of the head by attaching a warning label and/or providing a securing means which is tamper-resistant or at least tamper-evident, such that a new securing means, not readily available to unauthorized personnel is required before the head can be reattached.

Various approaches have been heretofore proposed for securing the brake actuator head to the flange case to prevent improvident disassembly of the two parts. GB Patent No. 2,000,225, for example, discloses in one embodiment a brake actuator including a head secured to a flange case with a circlip. The circlip is seated in an inwardly facing groove of the flange case and extends over an annular lip of the head, such that the head can only be separated from the flange case by deforming or destroying the flange case. The circlip, however, is accessible from between the flange case and an edge of the head and, therefore, could possibly be tampered with. Moreover, the design is complex, and therefore difficult and costly to manufacture and assemble.

The '225 patent, in another embodiment, also discloses a brake actuator including a head having a lower edge that is spun, or inelastically deformed, over a flange case, such that the head can only be separated from the flange case by deforming or destroying the lower edge of the head Similar arrangements are also disclosed in U.S. Pat. Nos. 4,850,263, 4,960,036, 5,067,391, 5,205,205, 5,263,403, 5,311,809, 5,433,138, and 5,640,894. A disadvantage of each of these prior art references is that special deforming machinery is needed to assemble the brake actuator, making assembly both costly and difficult. Another disadvantage is that the deformed lower edge of the head can easily be undeformed by an unauthorized person attempting to disassemble the brake actuator.

U.S. Pat. No. 5,285,716 discloses a brake actuator having a head and a flange case welded together in a tamperproof manner. As disclosed in the patent, however, it is a relatively easy task to grind away the weld to remove the head. In addition, the flange case must disadvantageously be made of steel in order to be welded to the steel head. Flange cases are normally made of aluminum.

U.S. Pat. Nos. 5,315,918 and 5,353,688 both disclose, in one embodiment, a brake actuator including a head screwed onto a flange case and secured with an insert or a pin creating an interference fit. The insert or pin may be welded in place. In another embodiment of the '918 and '688 patents, and in U.S. Pat. No. 4,887,513, a brake actuator is disclosed having a head which is joined to a flange case with a bayonet connection. U.S. Pat. No. 5,560,280 discloses a spring chamber head and adapter head, which include a plurality of cooperating peripheral lugs and flanges thereon. The flanges are held in registration with the lugs by the compression of the periphery of the spring brake diaphragm between the heads. A disadvantage of each of these prior art references is that the design is complex, and therefore difficult and costly to manufacture and assemble. A related disadvantage is that special and complex machinery is needed to assemble the brake actuator, making assembly even more costly and difficult.

What is desired, therefore, is a spring brake actuator which is tamper resistant, which is simple in design as compared with knownspring brake actuators, which is relatively easy and inexpensive to produce and assemble, which does not require special machinery to assemble, and which can be made of conventional materials.

SUMMARY OF THE INVENTION

Accordingly, it is an object of the present invention to provide a spring brake actuator which is tamper resistant.

Another object of the present invention is to provide a spring brake actuator having the above characteristics and which is simple in design as compared with known spring brake actuators.

A further object of the present invention is to provide a spring brake actuator having the above characteristics and which is relatively easy and inexpensive to produce and assemble.

Still another object of the present invention is to provide a spring brake actuator having the above characteristics and which does not require special machinery to assemble.

Yet a further object of the present invention is to provide a spring brake actuator having the above characteristics and which can be made of conventional materials.

These and other objects of the present invention are achieved by provision of a spring brake actuator having a flange case and a head. The flange case includes a radially outwardly extending annular flange, and the head includes a shoulder and a collar extending therefrom. The collar includes a plurality of radially spaced apart slots defining a plurality of radially spaced apart tabs, each of the tabs having a hook portion projecting radially inwardly, and each of the tabs being elastically deformable radially outwardly. In an assembled position, when the head is attached to the flange case, the annular flange of the flange case is received by the collar of the head and the hook portions of the tabs engage a lower surface of the annular flange so as to inhibit separation of the head from the flange case.

Preferably, the spring brake actuator also includes a continuous retaining wire disposed around the head in an assembled position, the retaining wire inhibiting the tabs from deforming radially outwardly so as to inhibit separation of the head from the flange case. In one embodiment, the retaining wire is positioned to abut the shoulder of the head adjacent to the collar. In another embodiment, the collar includes a peripheral annular groove therein, and the retaining wire is positioned in the annular groove.

It is also preferable if the hook portion of each of the tabs includes a barb which engages a corresponding annular recess in a mating surface of the annular flange of the flange case so as to further inhibit separation of the head from the flange case. In addition, it is preferable if the hook portion of each of the tabs includes a tapered outer lower edge which contacts the annular flange during assembly so as to promote radially outward flexing of the tabs during assembly.

The spring brake actuator also includes a spring diaphragm having a periphery, which is clamped in a fluid tight manner between the annular flange of the flange case and the collar of the head.

Moreover, the radially spaced apart slots preferably extend axially through the shoulder of the head and partially up a sidewall of the head, so as to promote radially outward flexing of the tabs during assembly. When such is the case, the force required to achieve radially outward flexing of the tabs during assembly is most preferably variable depending at least in part upon the extent which the radially spaced apart slots extend axially up the sidewall of the head.

In another aspect, the present invention relates to a method of assembling such a spring brake actuator.

The invention and its particular features and advantages will become more apparent from the following detailed description considered with reference to the accompanying drawings.

BRIEF DESCRIPTION OF HE DRAWINGS

DETAILED DESCRIPTION OF THE DRAWINGS

Figure 1:
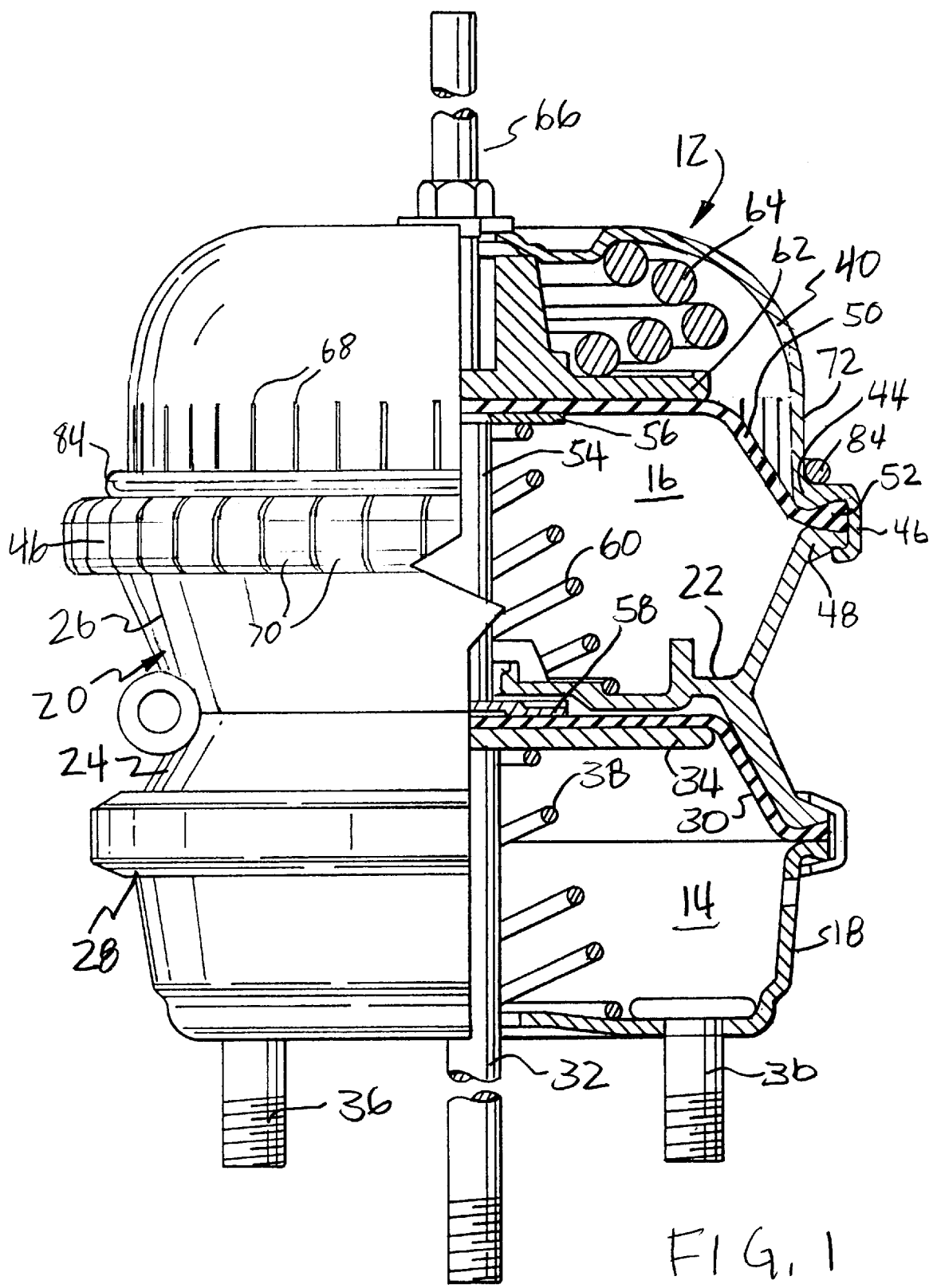
FIG. 1 is a side elevation view, partially in section, of a spring brake actuator in accordance with the present invention.
Figure 2:
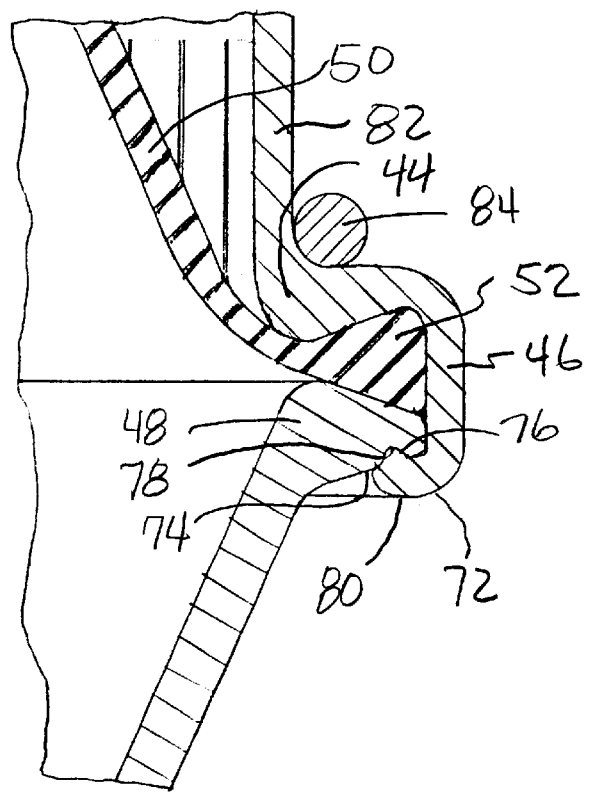
FIG. 2 is an enlarged side sectional view of a portion of the spring brake actuator of FIG. 1.

Referring first to FIGS. 1 and 2, a brake actuator 10 according to the present invention is shown. The embodiment shown is an air operated dual diaphragm spring brake actuator 10, which includes a housing 12 containing a service chamber 14 and a spring chamber 16 in tandem. The service chamber 14 is defined by a cup-shaped service housing 18 and a flange case 20. The flange case 20 is double cup-shaped and includes a divider wall 22 separating a service side 24 of the flange case 20 from a spring side 26 of the flange case 20. The service housing 18 is secured to the service side 24 of the flange case 20 using a conventional bolted clamp 28, or any other of numerous means as are known in the art. An elastomeric service brake diaphragm 30 is clamped in fluid tight engagement between the service housing 18 and the service side 24 of the flange case 20. Although not shown, an aperture is provided in the flange case 20 for providing communication between a source of compressed air and a portion of the service chamber 14 between the diaphragm 30 and the divider wall 22 of the flange case 20, also as is known in the art.

A service push rod 32 extends through the service housing 18 into the service chamber 14, and mounts a service push rod plate 34 at an inner end thereof. The service push rod 32 has a threaded outer end for connection to the braking system of a vehicle. In addition, bolts 36 are provided for mounting the service housing 18 to the vehicle. A service return spring 38 extends between the service housing 18 and the service push rod plate 34 to bias the service push rod plate 34 and thus the service push rod 32 into the service chamber 14 to release the brake. The spring biased service push rod plate 34 normally forces the service brake diaphragm 30 against the divider wall 22 of the flange case 20 in the brake release position.

When air pressure is supplied through the aperture in the service side 24 of the flange case 20 as, for example, when the brakes are applied by a vehicle operator, compressed air is introduced between the service brake diaphragm 30 and the divider wall 22, thereby forcing the diaphragm toward the service housing 18. In this manner, the service push rod 32 is extended outwardly of the service chamber 14 to apply braking pressure to the vehicle brakes in a conventional fashion.

The spring chamber 16 is defined by the spring side 26 of the flange case 20 and a head 40. The head 40 includes a lower edge 42, a shoulder portion 44 and a collar 46 extending therebetween. The collar 46 tightly fits over, and is secured to, a radially outwardly extending flange portion 48 of the spring side 26 of the flange case 20, as described below in detail. A spring diaphragm 50 has a periphery 52 clamped in a fluid tight manner between radially outwardly extending flange portion 48 of the spring side 26 of the flange case 20 and collar 46 of the head 40.

An aperture (not shown) is provided within the spring side 26 of the flange case 20 to connect a portion of the spring chamber 16 between the dividing wall 22 and the spring diaphragm 50 with a source of compressed air (not shown). A flange case push rod 54 extends between the spring chamber 16 and the service chamber 14, and has a first reaction plate 56 rigidly mounted to one end, and a second reaction plate 58 mounted to the other end thereof. A return spring 60 is mounted within the spring chamber 16 between the divider wall 22 and the first reaction plate 56 to bias the flange case push rod 54 into the release position.

A pressure plate 62 bears against the spring diaphragm 50, and a power spring 64 is positioned between the pressure plate 62 and the head 40 to bias the pressure plate 62 and the push rods 32,54 to a brake actuating position. The flange case 20 is typically cast aluminum and the head 40 is typically stamped or spun low-carbon steel. The actuator 10 may include a release tool 66 that extends within the head 40 for mechanically drawing the pressure plate 62 against the head 40 such that the power spring 64 assumes a retracted or "caged" position. The release tool 66 can thus mechanically release the brake after a loss of power or air pressure, as is known in the art.

In operation, air pressure is continually supplied to the spring chamber 16 through the aperture (not shown) to maintain the spring diaphragm 50 in a position to compress the power spring 64. In this position, the service push rod 32 normally is operated as described above by selective pressurization of air into the service chamber 14. However, in the event of failure of the air pressure system, the pressure in the spring chamber 16 will be decreased so that the service return spring 38 and flange case return spring 60 would no longer be able to overcome the pressure of the much larger and stronger power spring 64. Thus, the pressure plate 62 forces the spring diaphragm 50 and thus the flange case push rod 54 outwardly, thereby also forcing the service push rod 32 outwardly to apply braking pressure to the brakes.

The power spring 64, therefore, must be compressed between the pressure plate 62 and the head 40 during normal driving and normal service brake mode, as shown in FIG. 1. In these modes, the power spring 64 exerts substantial force on head 40 in the direction away from flange case 20, such that improvident or unauthorized removal of the head 40 could cause the head 40 to separate from the flange case 20 with considerable force.

The present invention inhibits and discourages improvident removal of the head 40 by providing a snapfit arrangement that secures the head 40 to the flange case 20. Collar 46 of head 40 is provided with a plurality of axial slots 68 radially spaced apart, such that collar 46 defines a plurality of discrete tabs 70. The lower edge of each tab 70 includes a hook portion 72 which extends radially inwardly to such an extent that hook portions 72 engage radially extending flange portion 48 of flange case 20when head 40 and flange case 20 are in an assembled position (shown in FIGS. 1 and 2). Preferably, inner surface 74 of hook portion 72 of each tab 70 includes a barb 76 which engages a corresponding annular recess 78 in a mating surface of radially extending flange portion 48 of flange case 20 so as to further inhibit head 40 from being pulled off of flange case 20.

In order to assemble the head 40 and the flange case 20, periphery 52 of spring diaphragm 50 is seated in radially outwardly extending flange portion 48 of the spring side 26 of the flange case 20 and enough compressive force is applied to overcome the spring forces of springs 38,60,64 and to bring collar 46 of the head 40 in contact with radially outwardly extending flange portion 48. Further compressive force is applied between head 40 and flange case 20 and tabs 70 are forced to elastically deform outwardly by their contact with flange portion 48 of flange case 20. Once tabs 70 elastically deform outwardly to a sufficient degree, head 40 is moved downwardly with respect to flange case 20 until hook portions 72 of tabs 70 move past flange portion 48 of flange case 20, at which point tabs 70 snap back inwardly. The compressive forces are removed, and barbs 76 engage annular recess 78 of flange portion 48 of flange case 20 under the forces generated by springs 38,60,64 such head 40 tightly fits over, and is secured to, spring side 26 of the flange case 20.

Preferably, slots 68 extend axially through shoulder portion 44 of head, and partially up wall 82 of head 40, so as to promote the outward flexing (i.e., elastic deformation) of tabs 70. It should be understood that the further up wall 82 that slots 68 extend, the less force that will be required to elastically deform tabs 70. Most preferably, slots 68 should extend up wall 72 to such a degree that flexing of tabs 70 over flange portion 48 is promoted, but the structural integrity of head 40 is not degraded. In addition, flexing of tabs 70 over flange portion 48 is preferably also promoted by providing the outer lower edge 80 of hook portions 72 with an inwardly curved or tapered surface which contacts flange portion 48 during assembly such that tabs 70 flex outwardly.

While not required, it may be desirable to provide, after assembly, a continuous retaining ring or wire 84 to further aid in the retention of head 40 on flange case 20. Retaining ring or wire 84 may be slid onto head 40 from above until it reaches shoulder portion 44 of head 40 adjacent to collar 46. Retaining ring or wire 84, which is preferably fabricated from steel, aluminum, or some other metal which is not prone to ready deformation, aids in the retention of head 40 on flange case 20 by inhibiting tabs 70 from flexing outwardly, as would be required for disassembly.

Figure 4:
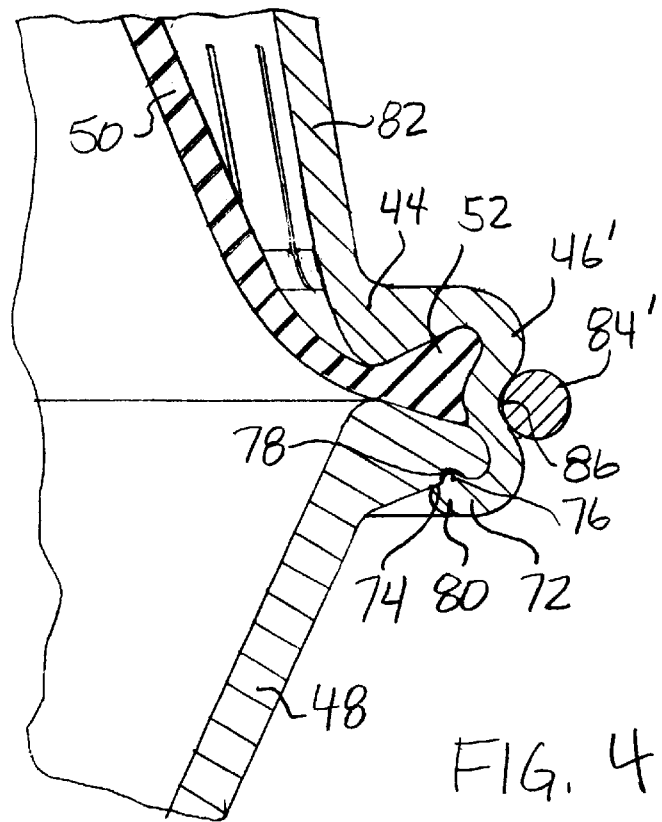
FIG. 4 is an enlarged side sectional view of a portion of the spring brake actuator of FIG. 3.
Figure 3:
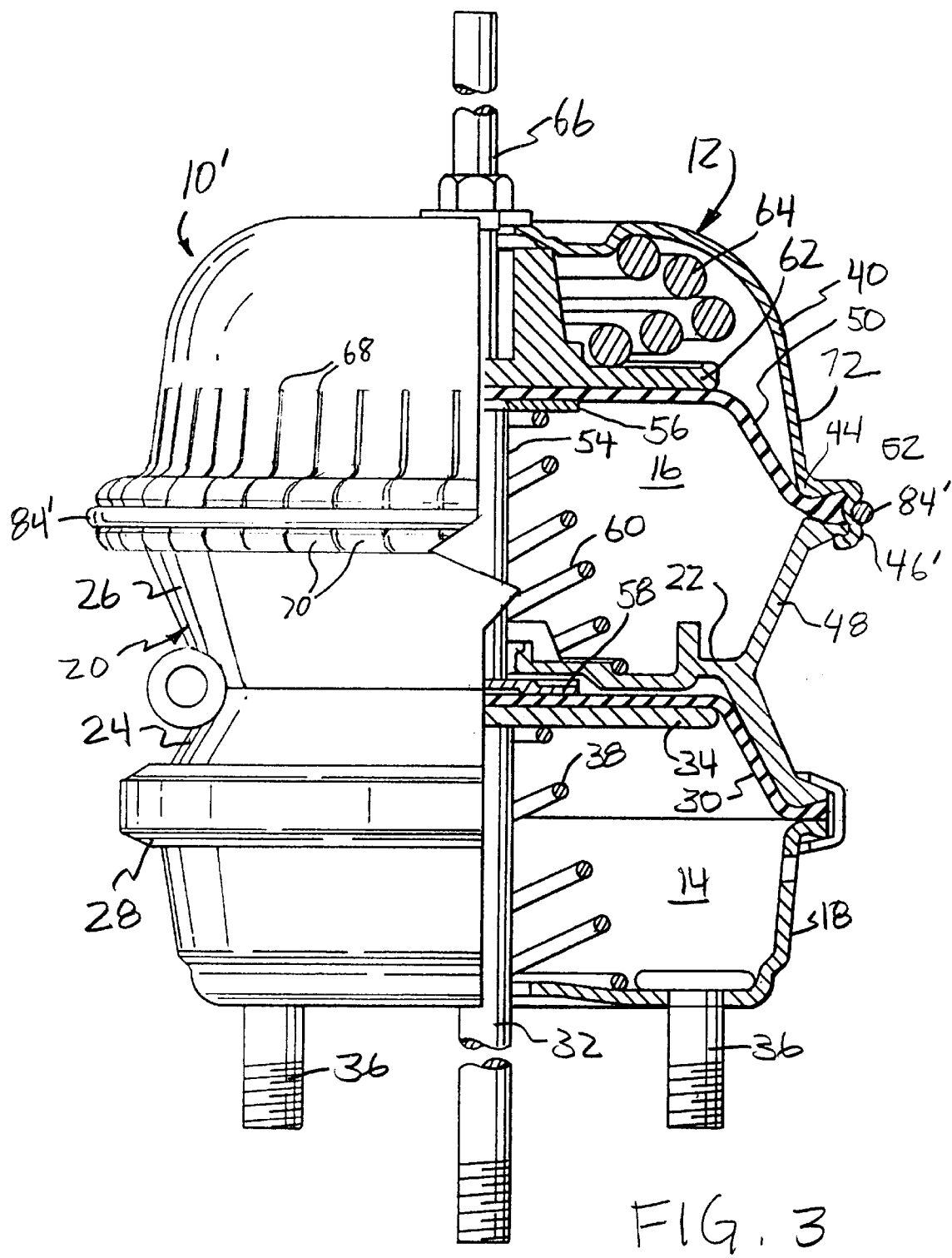
FIG. 3 is a side elevation view, partially in section, of another embodiment of a spring brake actuator in accordance with the present invention.

Referring now to FIGS. 3 and 4, another embodiment of a brake actuator 10' according to the present invention is shown. This embodiment is similar to the embodiment discussed above with reference to FIGS. 1 and 2, the main difference being the location of retaining ring or wire 84, if provided. Rather than retaining ring of wire 84 being positioned to abut shoulder portion 44 of head 40 adjacent to collar 46, retaining ring or wire 84' is positioned in an annular peripheral groove 86 formed in collar 46'. By providing such a groove 86 to receive retaining ring or wire 84', retaining ring or wire 84', is even more difficult to remove, thus further inhibiting tampering with brake actuator 10'.

The present invention, therefore, provides a spring brake actuator which is tamper resistant, which is simple in design as compared with known spring brake actuators, which is relatively easy and inexpensive to produce and assemble, which does not require special machinery to assemble, and which can be made of conventional materials.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A spring brake actuator comprising:
    a flange case, said flange case having a radially outwardly extending annular flange;
    a head, said head having a shoulder and a collar extending therefrom, the collar having a plurality of radially spaced apart slots defining a plurality of radially spaced apart tabs, each of the tabs having a hook portion projecting radially inwardly, and each of the tabs being elastically deformable radially outwardly; and
    wherein in an assembled position, when said head is attached to said flange case, the annular flange of said flange case is received by the collar of said head and the hook portions of the tabs engage a lower surface of the annular flange so as to inhibit separation of said head from said flange case.

2. The spring brake actuator of claim 1 further comprising a continuous retaining wire disposed around said head in an assembled position, said retaining wire inhibiting the tabs from deforming radially outwardly so as to inhibit separation of said head from said flange case.

3. The spring brake actuator of claim 2 wherein said retaining wire is positioned to abut the shoulder of said head adjacent to the collar.

4. The spring brake actuator of claim 2 wherein the collar includes a peripheral annular groove therein, and wherein said retaining wire is positioned in the annular groove.

5. The spring brake actuator of claim 1 wherein the hook portion of each of the tabs includes a barb which engages a corresponding annular recess in a mating surface of the annular flange of said flange case so as to further inhibit separation of said head from said flange case.

6. The spring brake actuator of claim 1 wherein the hook portion of each of the tabs includes a tapered outer lower edge which contacts the annular flange during assembly so as to promote radially outward flexing of the tabs during assembly.

7. The spring brake actuator of claim 1 further comprising a spring diaphragm having a periphery, the periphery of said spring diaphragm being clamped in a fluid tight manner between the annular flange of said flange case and the collar of said head.

8. The spring brake actuator of claim 1 wherein the radially spaced apart slots extend axially through the shoulder of said head and partial up a sidewall of said head, so as to promote radially outward flexing of the tabs during assembly.

9. The spring brake actuator of claim 8 wherein a force required to achieve radially outward flexing of the tabs during assembly is variable depending at least in part upon the extent which the radially spaced apart slots extend axially up the sidewall of said head.

10. A spring brake actuator comprising:
a flange case, said flange case having a radially outwardly extending annular flange;
a head, said head having a shoulder and a collar extending therefrom, the collar having a plurality of radially spaced apart slots defining a plurality of radially spaced apart tabs, each of the tabs having a hook portion projecting radially inwardly, and each of the tabs being elastically deformable radially outwardly;
wherein in an assembled position, when said head is attached to said flange case, the annular flange of said flange case is received by the collar of said head and the hook portions of the tabs engage alower surface of the annular flange so as to inhibit separation of said head from said flange case; and
a continuous retaining wire disposed around said head in an assembled in a position abutting the shoulder of said head adjacent to the collar, said retaining wire inhibiting the tabs from deforming radially outwardly so as to inhibit separation of said head from said flange case.

11. The spring brake actuator of claim 10 wherein the hook portion of each of the tabs includes a barb which engages a corresponding annular recess in a mating surface of the annular flange of said flange case so as to further inhibit separation of said head from said flange case.

12. The spring brake actuator of claim 10 wherein the hook portion of each of the tabs includes a tapered outer lower edge which contacts the annular flange during assembly so as to promote radially outward flexing of the tabs during assembly.

13. The spring brake actuator of claim 10 further comprising a spring diaphragm having a periphery, the periphery of said spring diaphragm being clamped in a fluid tight manner between the annular flange of said flange case and the collar of said head.

14. The spring brake actuator of claim 10 wherein the radially spaced apart slots extend axially through the shoulder of said head and partially up a sidewall of said head, so as to promote radially outward flexing of the tabs during assembly.

15. The spring brake actuator of claim 14 wherein a force required to achieve radially outward flexing of the tabs during assembly is variable depending at least in part upon the extent which the radially spaced apart slots extend axially up the sidewall of said head.

16. A spring brake actuator comprising:
a flange case, said flange case having a radially outwardly extending annular flange;
a head, said head having a shoulder and a collar extending therefrom, the collar having a peripheral annular groove therein and having a plurality of radially spaced apart slots defining a plurality of radially spaced apart tabs, each of the tabs having a hook portion projecting radially inwardly, and each of the tabs being elastically deformable radially outwardly;
wherein in an assembled position, when said head is attached to said flange case, the annular flange of said flange case is received by the collar of said head and the hook portions of the tabs engage a lower surface of the annular flange so as to inhibit separation of said head from said flange case;
a continuous retaining wire disposed around said head in an assembled within the annular groove in the collar, said retaining wire inhibiting the tabs from deforming radially outwardly so as to inhibit separation of said head from said flange case.

17. The spring brake actuator of claim 16 wherein the hook portion of each of the tabs includes a barb which engages a corresponding annular recess in a mating surface of the annular flange of said flange case so as to further inhibit separation of said head from said flange case.

18. The spring brake actuator of claim 16 wherein the hook portion of each of the tabs includes a tapered outer lower edge which contacts the annular flange during assembly so as to promote radially outward flexing of the tabs during assembly.

19. The spring brake actuator of claim 16 further comprising a spring diaphragm having a periphery, the periphery of said spring diaphragm being clamped in a fluid tight manner between the annular flange of said flange case and the collar of said head.

20. The spring brake actuator of claim 16 wherein the radially space apart slots extend axially through the shoulder of said head and partially up a sidewall of said head, so as to promote radially outward flexing of the tabs during assembly.

21. The spring brake actuator of claim 20 wherein a force required to achieve radially outward flexing of the tabs during assembly is variable depending at least in part upon the extent which the radially spaced apart slots extend axially up the sidewall of said head.

22. A two-chamber air brake actuator comprising:
a service chamber assembly; and a spring brake assembly joined in tandem with said service chamber assembly, said spring brake assembly comprising:
a flange case, said flange case having a radially outwardly extending annular flange;
a head, said head having a shoulderand a collar extending therefrom, the collar having a plurality of radially spaced apart slots defining a plurality of radially spaced apart tabs, each of the tabs having a hook portion projecting radially inwardly, and each of the tabs being elastically deformable radially outwardly; and
wherein in an assembled position, when said head is attached to said flange case, the annular flange of said flange case is received by the collar of said head and the hook portions of the tabs engage a lower surface of the annular flange so as to inhibit separation of said head from said flange case.

23. The air brake actuator of claim 22 further comprising a continuous retaining wire disposed around said head in an assembled position, said retaining wire inhibiting the tabs from deforming radially outwardly so as to inhibit separation of said head from said flange case.

24. The air brake actuator of claim 23 wherein said retaining wire is positioned to abut the shoulder of said head adjacent to the collar.

25. The air brake actuator of claim 23 wherein the collar includes a peripheral annular groove therein, and wherein said retaining wire is positioned in the annular groove.

26. The air brake actuator of claim 22 wherein the hook portion of each of the tabs includes a barb which engages a corresponding annular recess in a mating surface of the annular flange of said flange case so as to further inhibit separation of said head from said flange case.

27. The air brake actuator of claim 22 wherein the hook portion of each of the tabs includes a tapered outer lower edge which c contacts the annular flange during assembly so as to promote radially outward flexing of the tabs during assembly.

28. The air brake actuator of claim 22 further comprising a spring diaphragm having a periphery, the periphery of said spring diaphragm being clamped in a fluid tight manner between the annular flange of said flange case a and the collar of said head.

29. The air brake actuator of claim 22 wherein the radially spaced apart slots extend axially through the shoulder of said head and partially up a sidewall of said head, so as to promote radially outward flexing of the tabs during assembly.

30. The air brake actuator of claim 29 wherein a force required to achieve radially outward flexing of the tabs during assembly is variable depending at least in part upon the extent which the radially spaced apart slots extend axially up the sidewall of said head.

31. A method of assembling a spring brake actuator comprising the steps of:
providing a flange case, the flange case having a radially outwardly extending annular flange;
providing a head, the head having a shoulder and a collar extending therefrom, the collar having a plurality of radially spaced apart slots defining a plurality of radially spaced apart tabs, each of the tabs having a hook portion projecting radially inwardly, and each of the tabs being elastically deformable radially outwardly;
compressing the flange case and the head and elastically deforming the tabs radially outwardly as the tabs contact the outwardly projecting flange of the flange case until the tabs move past the outwardly projecting flange of the flange case, at which point the tabs deform back inwardly; and
inhibiting separation of the head from the flange case by receiving the annular flange of the flange case in the collar of the head, and engaging the hook portions of the tabs with a lower surface of the annular flange.

32. The method of claim 31 further comprising the steps of:
disposing a continuous retaining were around the head in an assembled position; and
inhibiting the tabs from deforming radially outwardly with the retaining wire so as to inhibit separation of the head from the flange case.

33. The method of claim 32 wherein said disposing step comprises the step of disposing a continuous retaining wire around the head in an assembled in a position abutting the shoulder of the head adjacent to the collar.

34. The method of claim 32 wherein the collar includes a peripheral annular groove therein, and wherein said disposing step comprises the step of disposing a continuous retaining wire around the head in the annular groove.

35. The method of claim 31 wherein the hook portion of each of the tabs includes a barb and the annular flange of the flange case includes a corresponding annular recess in a mating surface thereof, and further comprising the step of further inhibiting separation of the head from the flange case by causing the barbs to engage the annular recess.

36. The method of claim 31 further comprising the step of promoting radially outward flexing of the tabs during assembly by providing the hook portion of each of the tabs with a tapered outer lower edge which contacts the annular flange during assembly.

37. The method of claim 31 further comprising the steps of:
providing a spring diaphragm having a periphery; and
clamping the periphery of the spring diaphragm in a fluid tight manner between the annular flange of the flange case the collar of the head.

38. The method of claim 31 further comprising the step of promoting radially outward flexing of the tabs during assembly by extending the radially spaced apart slots axially through the shoulder of the head and partially up a sidewall of the head.

39. The method of claim 38 wherein further comprising the step of varying a force required to achieve radially outward flexing of the tabs during assembly by varying the extent which the radially spaced apart slots extend axially up the sidewall of the head.

* * * * *